United States Patent
Tseng

(10) Patent No.: US 8,405,334 B2
(45) Date of Patent: Mar. 26, 2013

(54) MOTOR DRIVING CIRCUIT

(75) Inventor: Kuan-Shu Tseng, Xindian (TW)

(73) Assignee: Timotion Technology Co., Ltd., New Taipei (TW)

( * ) Notice: Subject to any disclaimer, the term of this patent is extended or adjusted under 35 U.S.C. 154(b) by 421 days.

(21) Appl. No.: 12/900,742

(22) Filed: Oct. 8, 2010

(65) Prior Publication Data

US 2012/0086370 A1   Apr. 12, 2012

(51) Int. Cl.
*H02P 6/14* (2006.01)
(52) U.S. Cl. ............... 318/400.26; 318/400.01; 318/700
(58) Field of Classification Search ............. 318/400.01, 318/400.26, 700
See application file for complete search history.

(56) References Cited

U.S. PATENT DOCUMENTS

| | | | | | |
|---|---|---|---|---|---|
| 4,434,931 | A | * | 3/1984 | Hunt et al. | 232/15 |
| 4,471,275 | A | * | 9/1984 | Comeau | 318/286 |
| RE33,873 | E | * | 4/1992 | Romano | 340/543 |
| 5,160,881 | A | * | 11/1992 | Schramm et al. | 322/7 |
| 6,227,806 | B1 | * | 5/2001 | Libfeld | 417/36 |

FOREIGN PATENT DOCUMENTS

| DE | 19921344 A1 | 11/2000 |
|---|---|---|
| DE | 102007034144 A1 | 3/2008 |

* cited by examiner

*Primary Examiner* — Kawing Chan
(74) *Attorney, Agent, or Firm* — Chun-Ming Shih; HDLS IPR Services

(57) ABSTRACT

A motor driving circuit is applied to a motor unit, a pushrod unit, and a load unit. The motor unit is driven by the motor driving circuit. The pushrod unit is driven by the motor unit to lengthen or shorten. The load unit is pushed by the pushrod unit. A relay unit of the motor driving circuit is provided to brake the motor unit, thus raising the self-locking force of the motor unit when the pushrod unit lengthens to the maximum length or shortens to the minimum length, or the power supply is cut off.

10 Claims, 3 Drawing Sheets

PAIOR ART

MOTOR DRIVING CIRCUIT

BACKGROUND OF THE INVENTION

1. Field of the Invention

The present invention relates to a driving circuit, and more particularly to a motor driving circuit.

2. Description of Prior Art

A sickbed can provide a comfortable sleeping for a patient. Especially, the medical staffs or the caretakers can operate the sickbed to make the patient feel comfortable when the patient needs to lean against the sickbed at a certain angle. Accordingly, the motor apparatus, which is used to drive the sickbed, should be provided with a safety requirement during driving the sickbed. For example, the motor apparatus must automatically stop driving when the inclined angle of the sickbed is ultimate or provide a sufficient force to support the sickbed when the sickbed is positioned at a certain angle.

Reference is made to FIG. 1 which is a block diagram of an application embodiment of the prior art motor driving circuit. A motor driving circuit 10A drives a motor unit 20 to lengthen or shorten a pushrod unit 30, thus pushing a load unit 40. The load unit 40 can be a sickbed.

However, the existing sickbed has a major disadvantage. Namely, the self-locking force, which is produced from the motor apparatus, is insufficient to firmly sustain the sickbed, thus rocking of the sickbed would occur when the sickbed is positioned at a certain angle.

SUMMARY OF THE INVENTION

In order to overcome the above-mentioned disadvantages, a motor driving circuit is disclosed to increase the self-locking force of the motor.

In order to achieve the above-mentioned objective, the motor driving circuit includes a relay unit, a first diode unit, a second diode unit, a fourth diode unit, a fifth diode unit, a sixth diode unit, a eighth diode unit, and a first transistor unit. The relay unit has a first pin, a second pin, a third pin, a fourth pin, and a fifth pin. The first pin is electrically connected to a first motor contact, the second pin is electrically connected to a first power contact, and the third pin is electrically connected to a second motor contact. The first pin is electrically connected to the second pin when currents flow through the fifth pin and the fourth pin. However, the first pin is electrically connected to the third pin when no current flows through the fifth pin and the fourth pin. The first diode unit has an anode and a cathode. The anode of the first diode unit is electrically connected to the first power contact and the cathode of the first diode unit is electrically connected to the fifth pin. The second diode unit has an anode and a cathode. The anode of the second diode unit is electrically connected to a second power contact and the cathode of the second diode unit is electrically connected to the fifth pin. The fourth diode unit has an anode and a cathode. The anode of the fourth diode unit is electrically connected to the fourth pin and the cathode of the fourth diode unit is electrically connected to the first power contact. The fifth diode unit has an anode and a cathode. The anode of the fifth diode unit is electrically connected to the fourth pin and the cathode of the fifth diode unit is electrically connected to the second power contact. The sixth diode unit has an anode and a cathode. The anode of the sixth diode unit is electrically connected to the first power contact. The eighth diode unit has an anode and a cathode. The anode of the eighth diode is electrically connected to the second power contact. The first transistor unit has a first terminal, a second terminal, and a third terminal. The first terminal of the first transistor unit is electrically connected to the second motor contact, the second terminal of the first transistor unit is electrically connected to the cathode of the sixth diode unit, and the third terminal of the first transistor unit is electrically connected to the second power contact.

It is to be understood that both the foregoing general description and the following detailed description are exemplary, and are intended to provide further explanation of the invention as claimed. Other advantages and features of the invention will be apparent from the following description, drawings and claims.

BRIEF DESCRIPTION OF DRAWING

The features of the invention believed to be novel are set forth with particularity in the appended claims. The invention itself, however, may be best understood by reference to the following detailed description of the invention, which describes an exemplary embodiment of the invention, taken in conjunction with the accompanying drawings, in which:

DETAILED DESCRIPTION OF THE INVENTION

Figure 1:
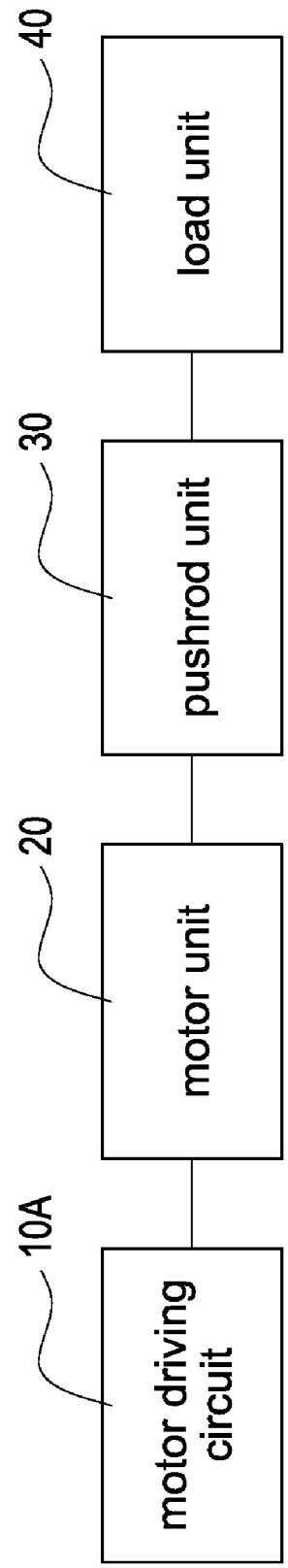
FIG. 1 is a block diagram of an application embodiment of the prior art motor driving circuit.

Reference will now be made to the drawing figures to describe the present invention in detail.

Figure 2:
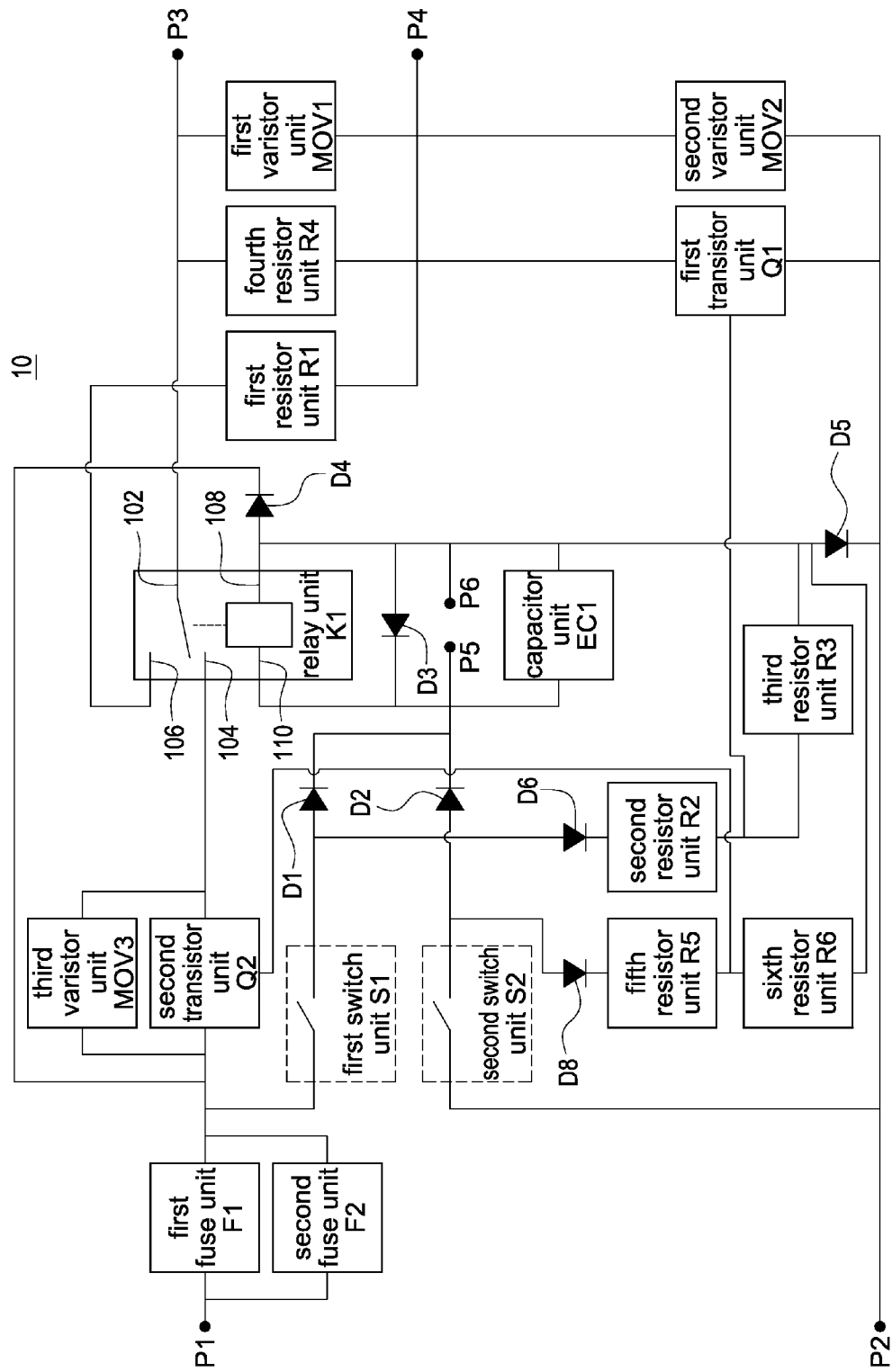
FIG. 2 is a circuit block diagram of a motor driving circuit according to the present invention.
Figure 3:
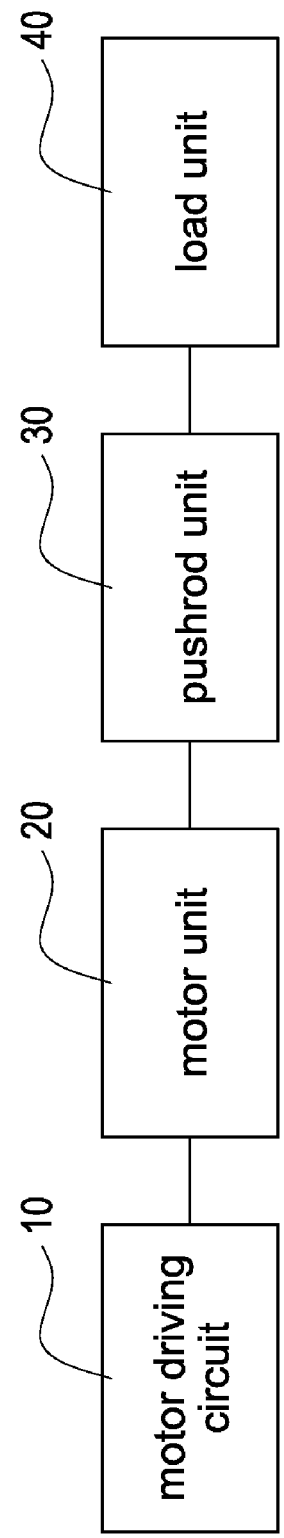
FIG. 3 is a block diagram of an application embodiment of the motor driving circuit.

Reference is made to FIG. 2 and FIG. 3 which are a circuit block diagram of a motor driving circuit and a block diagram of an application embodiment of the motor driving circuit according to the present invention, respectively. The motor driving circuit 10 drives a motor unit 20 to lengthen or shorten a pushrod unit 30, thus pushing a load unit 40. The load unit 40 can be a sickbed.

The motor driving circuit 10 includes a relay unit K1, a first diode unit D1, a second diode unit D2, a third diode unit D3, a fourth diode unit D4, a fifth diode unit D5, a sixth diode unit D6, a eighth diode unit D8, a first transistor unit Q1, a second transistor unit Q2, a first switch unit S1, a second switch unit S2, a first resistor unit R1, a second resistor unit R2, a third resistor unit R3, a fourth resistor unit R4, a fifth resistor unit R5, a sixth resistor unit R6, a capacitor unit EC1, a first varistor unit MOV1, a second varistor unit MOV2, a third varistor unit MOV3, a first power contact P1, a second power contact P2, a first motor contact P3, a second motor contact P4, a first motor electromagnetic braking contact P5, a second electromagnetic braking contact P6, a first fuse unit F1, and a second fuse unit F2. The relay unit K1 has a first pin 102, a second pin 104, a third pin 106, a fourth pin 108, and a fifth pin 110.

The first power contact P1 is electrically connected to one terminal of the first fuse unit F1 and one terminal of the second fuse unit F2. One terminal of the first switch unit S1 is electrically connected to the other terminal of the first fuse unit F1, the other terminal of the second fuse unit F2, a first terminal of the second transistor unit Q2, one terminal of the third varistor unit MOV3, and a cathode of the fourth diode unit D4. The second power contact P2 is electrically connected to one terminal of the second switch unit S2, a cathode of the fifth diode unit D5, a third terminal of the first transistor unit Q1, and one terminal of the second varistor unit MOV2.

The second pin 104 is electrically connected to a third terminal of the second transistor unit Q2 and the other terminal of the third varistor unit MOV3.

The first motor contact P3 is electrically connected to the first pin 102, one terminal of the fourth resistor unit R4, and one terminal of the first varistor unit MOV1. The second motor contact P4 is electrically connected to one terminal of the first resistor unit R1, the other terminal of the fourth resistor unit R4, the other terminal of the first varistor unit MOV1, a first terminal of the first transistor unit Q1, and the other terminal of the second varistor unit MOV2. The other terminal of the first resistor unit R1 is electrically connected to the third pin 106.

The first motor electromagnetic braking contact P5 is electrically connected to the fifth pin 110, a cathode of the first diode unit D1, a cathode of the second diode unit D2, a cathode of the third diode unit D3, and one terminal of the capacitor unit EC1. The second electromagnetic braking contact P6 is electrically connected to the fourth pin 108, an anode of the fourth diode unit D4, an anode of the third diode unit D3, the other terminal of the capacitor unit EC1, one terminal of the third resistor unit R3, and an anode of the fifth diode unit D5.

The other terminal of the first switch unit S1 is electrically connected to an anode of the first diode unit D1 and an anode of the sixth diode unit D6. The other terminal of the second switch unit S2 is electrically connected to an anode of the second diode unit D2 and an anode of the eighth diode unit D8. One terminal of the second resistor unit R2 is electrically connected to a cathode of the sixth diode unit D6, and the other terminal of the second resistor unit R2 is electrically connected to the other terminal of the third resistor unit R3 and a second terminal of the first transistor unit Q1. One terminal of the fifth resistor unit R5 is electrically connected to a cathode of the eighth diode unit D8, and the other terminal of the fifth resistor unit R5 is electrically connected to a second terminal of the second transistor unit Q2 and one terminal of the sixth resistor unit R6. The other terminal of the sixth resistor unit R6 is electrically connected to an anode of the fifth diode unit D5.

The first power contact P1 and the second power contact P2 are provided to connect to the power source. For example, the first power contact P1 is provided to connect to a positive terminal of a 24-volt DC voltage and the second power contact P2 is provided to connect to a negative terminal thereof. Alternatively, the first power contact P1 is provided to connect to a negative terminal of a 24-volt DC voltage and the second power contact P2 is provided to connect to a positive terminal thereof. The first power contact P1 and the second power contact P2 can be regarded as limit switches of the pushrod unit 30. The first switch unit S1 is turned off (opened) when the pushrod unit 30 lengthens to the maximum length; that is, the first switch unit S1 is turned on (closed) when the pushrod unit 30 does not lengthen to the maximum length. The second switch unit S2 is turned off (opened) when the pushrod unit 30 shortens to the minimum length; that is, the second switch unit S2 is turned on (closed) when the pushrod unit 30 does not shorten to the minimum length.

The first transistor unit Q1 can be a power metal-oxide-semiconductor field-effect transistor (MOSFET) and the second transistor unit Q2 can be also a power MOSFET. The first varistor unit MOV1 can be a metal oxide varistor (MOV), and the second varistor unit MOV2 and the third varistor unit MOV3 can be also MOVs. In particular, the varistor units MOV1~MOV3 are used to absorb the pulse noise voltage generated from the motor unit 20.

The value of the first resistor unit R1 can be much smaller, such as 0.33 ohms. The capacitor unit EC1 can be an electrolytic capacitor. The first motor electromagnetic braking contact P5 and the second electromagnetic braking contact P6 are provided to connect to the motor electromagnetic braking. The first motor contact P3 and the second motor contact P4 are provided to connect to the motor unit 20.

The first pin 102 is electrically connected to the second pin 104 when currents flow through both the fifth pin 110 and the fourth pin 108. However, the first pin 102 is electrically connected to the third pin 106 when no current flows through the fifth pin 110 and the fourth pin 108.

The detailed operation of the motor driving circuit 10 is described as follows:

1. The first switch unit S1 is turned on (closed) when the pushrod unit 30 does not lengthen to the maximum length, and the second switch unit S2 is turned on (closed) when the pushrod unit 30 does not shorten to the minimum length. Accordingly, two operations would be discussed as follows:

A. The relay unit K1 holds the first pin 102 and the second pin 104 (thus the first pin 102 connects to the second pin 104 are shorted) so that the motor unit 20 rotates forward to drive the pushrod unit 30 lengthening when the first power contact P1 is electrically connected to the positive terminal of the 24-volt DC voltage and the second power contact P2 is electrically connected to the negative terminal of the 24-volt DC voltage. The first transistor unit Q1 is turned on and the current sequentially flows through the first power contact P1, the second transistor unit Q2, the first motor contact P3, the motor unit 20, the second motor contact P4, the first transistor unit Q1, and the second power contact P2 when the motor unit 20 rotates forward.

B. The relay unit K1 holds the first pin 102 and the second pin 104 (thus the first pin 102 connects to the second pin 104) so that the motor unit 20 rotates reverse to drive the pushrod unit 30 shortening when the first power contact P1 is electrically connected to the negative terminal of the 24-volt DC voltage and the second power contact P2 is electrically connected to the positive terminal of the 24-volt DC voltage. The first transistor unit Q1 is turned on and the current sequentially flows through the second power contact P2, the first transistor unit Q1, the second motor contact P4, the motor unit 20, the first motor contact P3, the second transistor unit Q2, and the first power contact P1 when the motor unit 20 rotates reverse.

2. The first switch unit S1 is turned off (opened) when the pushrod unit 30 lengthens to the maximum length. Accordingly, the relay unit K1 releases the first pin 102 and the second pin 104 (thus the first pin 102 does not connect to the second pin 104) and holds the first pin 102 and the third pin 106 (thus the first pin 102 connects to the third pin 106), thus braking the motor unit 20 because of connecting (shorting) the first motor contact P3 and the second motor contact P4.

3. The second switch unit S2 is turned off (opened) when the pushrod unit 30 shortens to the minimum length. Accordingly, the relay unit K1 releases the first pin 102 and the second pin 104 (thus the first pin 102 does not connect to the second pin 104) and holds the first pin 102 and the third pin 106 (thus the first pin 102 connects to the third pin 106), thus braking the motor unit 20 because of connecting (shorting) the first motor contact P3 and the second motor contact P4.

In addition, the relay unit K1 releases the first pin 102 and the second pin 104 (thus the first pin 102 does not connect to the second pin 104) and holds the first pin 102 and the third pin 106 (thus the first pin 102 connects to the third pin 106) when the power supply is cut off and not supplied to the first power contact P1 and the second power contact P2, thus braking the motor unit 20 because of connecting (shorting) the first motor contact P3 and the second motor contact P4.

A positive voltage would be produced at the second motor contact P4 and a negative voltage would be produced at the first motor contact P3 when the power supply is cut off, thus the first transistor unit Q1 provides a voltage-isolation function to avoid feeding the produced voltage from the second motor contact P4 through the second switch unit S2. Accordingly, the relay unit K1 can release the first pin 102 and the second pin 104 and hold the first pin 102 and the third pin 106 so that the first motor contact P3 connects to the second motor contact P4, thus braking the motor unit 20.

In another operation, a positive voltage would be produced at the first motor contact P3 and a negative voltage would be produced at the second motor contact P4 when the power supply is cut off, thus the second transistor unit Q2 provides a voltage-isolation function to avoid feeding the produced voltage from the first motor contact P3 through the first switch unit S1. Accordingly, the relay unit K1 can release the first pin 102 and the second pin 104 and hold the first pin 102 and the third pin 106 so that the first motor contact P3 connects to the second motor contact P4, thus braking the motor unit 20.

In conclusion, the relay unit K1 of the motor driving circuit 10 is provided to connect (short) the first motor contact P3 and the second motor contact P4 to brake the motor unit 20, thus raising the self-locking force of the motor unit 20 when the pushrod unit 30 lengthens to the maximum length or shortens to the minimum length, or the power supply is cut off. However, the relay unit K1 is provided to disable the braking of the motor unit 20 when the pushrod unit 30 does not lengthen to the maximum length or shorten to the minimum length, or the power supply is normally provided. Accordingly, the motor unit 20 can be normally braked even without being influenced by the feeding voltage, which is generated from pushing the pushrod unit 30 by the weight of the load 40 (such as a sickbed) when the power supply is cut off.

Although the present invention has been described with reference to the preferred embodiment thereof, it will be understood that the invention is not limited to the details thereof. Various substitutions and modifications have been suggested in the foregoing description, and others will occur to those of ordinary skill in the art. Therefore, all such substitutions and modifications are intended to be embraced within the scope of the invention as defined in the appended claims.

What is claimed is:

1. A motor driving circuit, comprising:
a relay unit having a first pin, a second pin, a third pin, a fourth pin, and a fifth pin; the first pin electrically connected to a first motor contact, the second pin electrically connected to a first power contact, and the third pin electrically connected to a second motor contact; and the first pin electrically connected to the second pin when currents flowing through the fifth pin and the fourth pin, and the first pin electrically connected to the third pin when no current flowing through the fifth pin and the fourth pin;
a first diode unit having an anode and a cathode, and the anode of the first diode unit electrically connected to the first power contact and the cathode of the first diode unit electrically connected to the fifth pin;
a second diode unit having an anode and a cathode, and the anode of the second diode unit electrically connected to a second power contact and the cathode of the second diode unit electrically connected to the fifth pin;
a fourth diode unit having an anode and a cathode, and the anode of the fourth diode unit electrically connected to the fourth pin and the cathode of the fourth diode unit electrically connected to the first power contact;
a fifth diode unit having an anode and a cathode, and the anode of the fifth diode unit electrically connected to the fourth pin and the cathode of the fifth diode unit electrically connected to the second power contact;
a sixth diode unit having an anode and a cathode, and the anode of the sixth diode unit electrically connected to the first power contact;
a eighth diode unit having an anode and a cathode, and the anode of the eighth diode unit electrically connected to the second power contact;
a first transistor unit having a first terminal, a second terminal, and a third terminal, and the first terminal of the first transistor unit electrically connected to the second motor contact, the second terminal of the first transistor unit electrically connected to the cathode of the sixth diode unit, and the third terminal of the first transistor unit electrically connected to the second power contact.

2. The motor driving circuit in claim 1, further comprising a second transistor having a first terminal, a second terminal, and a third terminal, and the first terminal of the second transistor electrically connected to the first power contact and the third terminal of the second transistor electrically connected to the second pin.

3. The motor driving circuit in claim 1, further comprising a third diode unit having an anode and a cathode, and the anode of the third diode unit electrically connected to the fourth pin and the cathode of the third diode unit electrically connected to the fifth pin.

4. The motor driving circuit in claim 3, further comprising a first switch unit having two terminals, and one terminal of the first switch unit electrically connected to the first power contact and the other terminal of the first switch unit electrically connected to the anode of the first diode unit and the anode of the sixth diode unit.

5. The motor driving circuit in claim 4, further comprising a second switch unit having two terminals, and one terminal of the second switch unit electrically connected to the second power contact and the other terminal of the second switch unit electrically connected to the anode of the second diode unit and the anode of the eighth diode unit.

6. The motor driving circuit in claim 5, further comprising:
a first resistor unit having two terminals, and one terminal of the first resistor unit electrically connected to the third pin and the other terminal of the first resistor unit electrically connected to the second motor contact;
a second resistor unit having two terminals, and one terminal of the second resistor unit electrically connected to the cathode of the sixth diode unit and the other terminal of the second resistor unit electrically connected to the second terminal of the first transistor unit;
a third resistor unit having two terminals, and one terminal of the third resistor unit electrically connected to the second terminal of the first transistor unit and the other terminal of the third resistor unit electrically connected to the fourth pin;
a fourth resistor unit having two terminals, and one terminal of the fourth resistor unit electrically connected to the first motor contact and the other terminal of the fourth resistor unit electrically connected to the second motor contact;
a fifth resistor unit having two terminals, and one terminal of the fifth resistor unit electrically connected to the cathode of the eighth diode unit and the other terminal of the fifth resistor unit electrically connected to the second terminal of the second transistor unit; and a sixth resistor unit having two terminals, and one terminal of the sixth resistor unit electrically connected to the second terminal of the second transistor unit and the other terminal of the sixth resistor unit electrically connected to the anode of the fifth diode unit.

7. The motor driving circuit in claim 6, further comprising:
a first varistor unit having two terminals, and one terminal of the first varistor unit electrically connected to the first motor contact and the other terminal of the first varistor unit electrically connected to the second motor contact;
a second varistor unit having two terminals, and one terminal of the second varistor unit electrically connected to the second motor contact and the other terminal of the second varistor unit electrically connected to the second power contact; and
a third varistor unit having two terminals, and one terminal of the third varistor unit electrically connected to the second motor contact and the other terminal of the third varistor unit electrically connected to the second pin.

8. The motor driving circuit in claim 7, further comprising:
a first fuse unit having two terminals, and one terminal of the first fuse unit electrically connected to the first power contact and the other terminal of the first fuse unit electrically connected to the first terminal of the second transistor unit; and
a second fuse unit having two terminals, and one terminal of the second fuse unit electrically connected to the first power contact and the other terminal of the second fuse unit electrically connected to the first terminal of the second transistor unit.

9. The motor driving circuit in claim 8, wherein the first transistor unit is a power metal-oxide-semiconductor field-effect transistor (MOSFET) and the second transistor unit is a power MOSFET.

10. The motor driving circuit in claim 9, wherein the first varistor unit is a metal oxide varistor (MOV), the second varistor unit is a MOV, and the third varistor is a MOV.

* * * * *